United States Patent [19]

Coleman

[11] 4,435,450
[45] Mar. 6, 1984

[54] METHOD FOR APPLYING ABRASION RESISTANT THIN POLYURETHANE COATINGS

[75] Inventor: Charles R. Coleman, Pittsburgh, Pa.

[73] Assignee: PPG Industries, Inc., Pittsburgh, Pa.

[21] Appl. No.: 394,556

[22] Filed: Jul. 2, 1982

[51] Int. Cl.$^3$ .............................................. B05D 3/02
[52] U.S. Cl. ................................ 427/385.5; 427/164; 427/165; 427/169; 427/389.7; 427/393.5
[58] Field of Search ................. 427/385.5, 393.5, 164, 427/165, 169, 389.7; 428/412, 423.1, 423.3, 423.7; 528/60

[56] References Cited

U.S. PATENT DOCUMENTS

| | | | |
|---|---|---|---|
| 1,010,311 | 3/1977 | Lewis et al. | 428/423.1 X |
| 4,045,269 | 8/1977 | Voss et al. | 427/385.5 X |
| 4,064,194 | 12/1977 | Evans et al. | 427/385.5 X |
| 4,079,160 | 3/1978 | Philipson | 428/217 |
| 4,174,240 | 11/1979 | Müller et al. | 156/331.7 X |
| 4,251,427 | 2/1981 | Recker et al. | 427/393.5 X |
| 4,307,004 | 12/1981 | Schuhmacher et al. | 428/423.1 X |
| 4,343,839 | 8/1982 | Blegen | 427/393.5 X |

Primary Examiner—Thurman K. Page
Attorney, Agent, or Firm—Donna L. Seidel

[57] ABSTRACT

A method for applying a thin abrasion resistant polyurethane coating while minimizing exposure to volatile free isocyanate is disclosed. The method involves forming a hydroxy-terminated prepolymer which is subsequently crosslinked using a relatively non-volatile triisocyanate, and applying the material by flow coating or dip coating techniques, rather than spraying, in order to minimize volatilization.

10 Claims, No Drawings

METHOD FOR APPLYING ABRASION RESISTANT THIN POLYURETHANE COATINGS

BACKGROUND OF THE INVENTION

1. Field of the Invention

The present invention relates generally to abrasion resistant polyurethane coatings, and more particularly to a method for applying thin polyurethane coatings.

2. Discussion of the Technology

U.S. Pat. No. 4,079,160 to Phillipson teaches an optical element, such as an eyeglass lens, formed of a typical rigid polymeric substrate of relatively low scratch resistance coated on at least one surface with a relatively soft, resilient and tough, transparent polymeric material. Spinning techniques are disclosed to be particularly suitable for applying the coating to the lens.

U.S. Pat. No. 4,174,240 to Muller teaches laminates wherein glass or glass-like plastics are coated with a transparent film 0.1 to 5 millimeters thick formed from a polyurethane polyurea containing 1 to 20 percent by weight urea groups and 0.001 to 10 percent by weight lateral —COOH groups. The polyurethane polyurea films are formed by solution casting or extrusion and are subsequently laminated to the substrates by the application of heat and pressure.

SUMMARY OF THE INVENTION

The present invention involves the use of relatively soft, resilient, crosslinked polyurethanes as abrasion resistant coatings. The polyurethanes of the present invention are prepared from aliphatic diisocyanates, straight chain polycarbonate diols, and crosslinking agents such as triisocyanates. The crosslinked aliphatic polycarbonate urethane coatings of the present invention are applied from solutions of prepolymer and crosslinking agent which are flow or dip coated onto a substrate, dried, and cured to form a coating less than 0.005 inch (0.13 millimeter) thick, preferably about 0.001 to 0.002 inch (0.025 to 0.05 millimeter) thick. By using a prepolymer and a relatively nonvolatile crosslinking agent, the method of the present invention minimizes exposure to volatile free isocyanate. Volatilization of isocyanate is further minimized by employing a coating technique whereby the substrate to be coated is contacted with the coating solution in a continuous liquid phase, such as in flow or dip coating, rather than a spray. The polyurethane coatings of the present invention are especially useful in aircraft transparencies as abrasion resistant coatings, either on rigid plastic layers such as polycarbonate or acrylic, or on resilient plastic layers such as impact resistant polyurethane in a glass bilayer laminate.

DESCRIPTION OF THE PREFERRED EMBODIMENTS

An abrasion resistant, crosslinked aliphatic polyurethane is prepared from a reaction mixture of an aliphatic organic diisocyanate, a polyol, and a high molecular weight triisocyanate. The polyol is preferably a polycarbonate diol having a molecular weight below 500. Tetrabutyl titanate catalyst is also preferred in accordance with U.S. Pat. No. 4,160,853, the disclosure of which is incorporated herein by reference.

The diisocyanate is preferably a cycloaliphatic diisocyanate such as 4,4'-methylene-bis(cyclohexyl isocyanate). Polyurethanes prepared from aliphatic isocyanates, particularly cycloaliphatic diisocyanates, have good physical and optical properties over a wide temperature range, and are not adversely affected by ultraviolet light. In addition to the most preferred diisocyanate, 4,4'-methylene-bis-(cyclohexyl isocyanate), other suitable aliphatic diisocyanates include 1,4-cyclohexyl diisocyanate, 4,4-isopropylidene-bis-(cyclohexyl isocyanate), and other dinuclear cycloaliphatic diisocyanates, preferably isophorone diisocyanate. Branched diisocyanates such as trimethylhexamethylene diisocyanate may also be used, preferably in combination with 4,4'-methylene-bis-(cyclohexyl isocyanate) or isphorone diisocyanate.

Polyols useful according to the present invention may be liquid at room temperature or soluble in the reaction mixture. Preferred polyols are polycarbonate diols having a molecular weight of about 200 to 500. A preferred polycarbonate diol is an oligomer reaction product of 1,6-hexanediol and a carbonate, which has an average molecular weight of about 400 to 440. The polycarbonate diols are preferably synthesized in accordance with the teachings of U.S. Pat. No. 4,160,853, the disclosure of which is incorporated herein by reference.

The triisocyanate preferably has a molecular weight greater than 500, preferably greater than 560. Preferred triisocyanates are relatively nonvolatile. Examples of preferred triisocyanates include a triisocyanurate of isophorone diisocyanate and a triisocyanate biuret of 1,6-hexamethylene diisocyanate. A preferred triisocyanurate of isophorone diisocyanate is available as T-1890s from Thorson Chemical Company, New York, N.Y., and a preferred triisocyanate biuret of 1,6-hexamethylene diisocyanate is available as Desmodur N from Mobay Chemical Corporation, Pittsburgh, Pa.

The aliphatic diisocyanate and polyol are preferably mixed together in a solvent under vacuum in a reaction kettle until the reaction mixture is single phase and well degassed. The reaction solution further comprises a catalyst, preferably the tetrabutyl titanate which is present in the polycarbonate diol synthesized by the preferred method disclosed above. The catalyst is preferably present at a level of about 100 to 1000 parts per million.

The diisocyanate and polycarbonate diol are reacted in appropriate proportions to form an OH-terminated prepolymer. The prepolymer is then crosslinked to form an abrasion resistant polyurethane by means of the triisocyanate crosslinking agent. In an alternative embodiment, the polyol, diisocyanate and crosslinking agent may be added together in a one-shot polymerization reaction mixture. The reaction solution may further comprise adhesion control additives and agents to improve weathering properties such as antioxidants and ultraviolet radiation absorbers.

The polyurethane reactants may be dissolved in any solvent for the reactants, preferably methyl ethyl ketone, propylacetate, toluene, cyclohexanone and mixtures thereof. The concentration of reactants is chosen to yield a viscosity suitable for the particular application technique. Preferred application techniques include flow coating and dip coating, as opposed to spraying, in order to minimize volatilization. The reaction solution preferably contains a wetting agent such as a fluorocarbon surfactant to improve the optical quality of the coating. The reaction solution preferably contains about 25 percent solids and dries to form a coating less than about 0.005 inch (0.13 millimeter) thick, preferably about 0.002 inch (about 0.05 millimeter) thick. The polyurethane is typically cured at temperatures from about 225° to 275° F. (about 107° to 135° C.). preferably about 250° to 275° F. (about 121° to 135° C.), for about 1 hour or longer to yield an abrasion resistant coating.

The present invention will be more fully understood from the descriptions of specific examples which follow.

EXAMPLE I

A hydroxy-terminated prepolymer is prepared by reacting 57 weight percent 1,6-hexanediol polycarbonate diol having an average molecular weight of about 420 with 43 weight percent 4,4'-methylene-bis-(cyclohexyl isocyanate) available as Desmodur W from Mobay Chemical Corporation, Pittsburgh, Pa. A polyurethane is prepared by reacting 81 weight percent of the prepolymer with 19 weight percent of triisocyanurate of isophorone diisocyanate. These reactants are dissolved at a concentration of 25 weight percent in a solvent comprising equal weights of toluene and cyclohexanone. The solution further comprises 1 percent each, based on the weight of polyurethane reactants, of an antioxidant and an ultraviolet radiation stabilizer, Irganox 1076 and Tinuvin 770 respectively, both available from CIBA-GIEGY Corporation, as well as 0.1 gram per 100 milliliters of solution of a wetting agent, FC 430 fluorosurfactant, available from the 3M Corporation, Minneapolis, Minn. The reaction mixture is coated onto a stretched acrylic sheet by flow coating, and is cured for 1½ hours using infrared heaters at 250° F. (about 121° C.) to form an abrasion resistant polyurethane coating. The abrasion resistance of the coating is measured by the increase in haze resulting from 300 cycles Bayer Abrader. Results are compared with haze measurements following abrasion of uncoated acrylic in the table below. Both coated and uncoated substrates initially exhibit about 1.6 percent haze as measured by a Gardner Automatic Pivotable Sphere Hazemeter with an illuminant C filter.

EXAMPLE II

A polyurethane composition is flow coated onto a transparent polycarbonate substrate and cured as in Example I. The abrasion resistance of coated and uncoated polycarbonate substrates are compared in the table below.

EXAMPLE III

A polyurethane composition is prepared from 78 weight percent of the prepolymer of Example I and 22 weight percent of a triisocyanate biuret of 1,6-hexamethylene diisocyanate. The composition further comprises the additives of Example I. The composition is applied by flow coating onto a polycarbonate sheet and cured to form an abrasion resistant coating. The abrasion resistance, measured by the haze increase after abrasion, is shown in the following table.

TABLE I

| Coating | Substrate | % Haze* |
|---|---|---|
| Example I | Acrylic | 4.8 |
| None | Acrylic | 56 |
| Example II | Polycarbonate | 5.4 |
| None | Polycarbonate | 70 |
| Example III | Polycarbonate | 3.3 |

*Measured with a Gardner Automatic Pivotable Sphere Hazemeter after 300 cycles Bayer Abrader.

EXAMPLE IV

A polyurethane reaction mixture is coated onto a preformed thermoplastic polyurethane sheet which is subsequently laminated to a glass sheet to form a bilayer laminate. The polyurethane reaction mixture comprises 78 weight percent of the prepolymer as in Example I and 22 weight percent of a triisocyanate biuret of 1,6-hexamethylene diisocyanate dissolved at a concentration of 25 weight percent in a solvent comprising equal weights of toluene and cyclohexanone. The reaction solution further comprises the antioxidant and ultraviolet radiation stabilizer described in Example I, along with 0.12 gram per 100 milliliters of the fluorosurfactant. The reaction mixture is flow coated onto the thermoplastic polyurethane sheet, dried, and cured during the lamination process to form a thin, abrasion resistant crosslinked polyurethane coating on the thermoplastic polyurethane surface of the bilayer laminate. The lamination process is described in detail in U.S. Pat. No. 3,808,079 to Rieser et al, the disclosure of which is incorporated herein by reference.

The above examples are offered to illustrate the present invention. Various modifications, such as the coating of other substrates, the use of other components, applying and curing by other means, etc. are included within the scope of the present invention, which is defined by the following claims.

I claim:
1. A method for applying an abrasion resistant polyurethane coating onto a surface of a substrate while minimizing volatilization of free isocyanate comprising the steps of:
   a. reacting an aliphatic diisocyanate with excess hydroxy-terminated diol to form a linear hydroxy-terminated prepolymer;
   b. adding to said prepolymer a triisocyanate crosslinking agent having a molecular weight greater than 500;
   c. applying said prepolymer and triisocyanate mixture in a solvent to the surface of the substrate by contacting said surface with said solution in a continuous liquid phase;
   d. evaporating said solvent; and
   e. reacting said prepolymer and triisocyanate to form a crosslinked polyurethane coating.
2. The method according to claim 1, wherein a continuous stream of solution is flowed onto the surface of the substrate.
3. The method according to claim 1, wherein the substrate is dipped into the solution.
4. The method according to claim 2 or claim 3, wherein the aliphatic diisocyanate is a cycloaliphatic diisocyanate and the polyol is a polyester polyol.
5. The method according to claim 4, wherein the cycloaliphatic diisocyanate is 4,4'-methylene-bis-(cyclohexyl isocyanate), the polyol is a polycarbonate diol, and the triisocyanate has a molecular weight greater than 560.
6. The method according to claim 5, wherein the prepolymer and triisocyanate are dissolved in a solvent selected from the group consisting of methyl ethyl ketone, propylacetate, toluene, cyclohexanone and mixtures thereof.
7. The method according to claim 6, wherein the prepolymer and triisocyanate are dissolved at a concentration of about 20 to 30 weight percent in a solvent comprising a mixture of toluene and cyclohexanone.
8. The method according to claim 6, wherein said solution further comprises a wetting agent.
9. The method according to claim 8, wherein said wetting agent is a fluorocarbon surfactant.
10. The method according to claim 9, wherein the crosslinked polyurethane coating has a thickness less than about 0.005 inch (about 0.13 millimeter).

* * * * *